(12) United States Patent
Eidloth et al.

(10) Patent No.: US 8,604,964 B2
(45) Date of Patent: Dec. 10, 2013

(54) SYSTEM FOR DETERMINING THE MOVEMENT OF A SWAYING STRUCTURE

(75) Inventors: Andreas Eidloth, Erlangen (DE); Norbert Franke, Erlangen (DE)

(73) Assignee: Fraunhofer-Gesellschaft zur Förderung der angewandten Forschung e.V. (DE)

( * ) Notice: Subject to any disclaimer, the term of this patent is extended or adjusted under 35 U.S.C. 154(b) by 210 days.

(21) Appl. No.: 13/124,277

(22) PCT Filed: Oct. 14, 2009

(86) PCT No.: PCT/EP2009/007577
§ 371 (c)(1),
(2), (4) Date: Jul. 13, 2011

(87) PCT Pub. No.: WO2010/043421
PCT Pub. Date: Apr. 22, 2010

(65) Prior Publication Data
US 2011/0304499 A1 Dec. 15, 2011

(30) Foreign Application Priority Data

Oct. 15, 2008 (DE) .......... 10 2008 052 799

(51) Int. Cl.
*G01S 13/62* (2006.01)

(52) U.S. Cl.
USPC ............ 342/28; 342/59; 342/95; 342/114; 342/125; 342/174; 342/463

(58) Field of Classification Search
USPC ............. 342/28, 59, 95, 114, 125, 173, 174, 342/450, 463
See application file for complete search history.

(56) References Cited

U.S. PATENT DOCUMENTS

| | | | | |
|---|---|---|---|---|
| 3,631,399 A | * | 12/1971 | Minns | 375/238 |
| 3,996,590 A | * | 12/1976 | Hammack | 342/465 |
| 4,283,726 A | * | 8/1981 | Spence et al. | 342/458 |
| 5,045,861 A | * | 9/1991 | Duffett-Smith | 342/457 |
| 5,163,004 A | | 11/1992 | Rentz | |
| 5,252,980 A | * | 10/1993 | Gray et al. | 342/59 |

(Continued)

FOREIGN PATENT DOCUMENTS

| DE | 100 55 289 A1 | 5/2002 |
|---|---|---|
| DE | 10 2007 046 366 A1 | 4/2008 |
| EP | 1556713 A1 | 7/2005 |

OTHER PUBLICATIONS

Loidl, Karin., "Ortung in zellularen Netzen", Fraunhofer-Institut fur integrierte Schaltungen IIS; Vierling Herbstmesse, (Sep. 19, 2005), 20 pgs.

(Continued)

*Primary Examiner* — John B Sotomayor
(74) *Attorney, Agent, or Firm* — Schwegman Lundberg & Woessner, P.A.

(57) ABSTRACT

A system for determining the movement of a swaying structure, on which a receiver is fixedly mounted, is proposed, wherein at least three reference transmitters having known and fixed positions are provided and transmit the transmission signals received by the receiver at defined carrier frequencies. In addition, an evaluation unit is provided, which determines measured phase values from the received signals, taking into account the defined carrier frequency, wherein the distance from the reference transmitters and the changes in position of the receiver and therefore of the swaying structure can be calculated from said phase values.

8 Claims, 6 Drawing Sheets

(56) References Cited

U.S. PATENT DOCUMENTS

| | | | |
|---|---|---|---|
| 5,293,645 A | 3/1994 | Sood | |
| 5,657,003 A * | 8/1997 | Fuentes | 340/690 |
| 6,300,903 B1 * | 10/2001 | Richards et al. | 342/450 |
| 6,366,854 B1 | 4/2002 | Tsuchiya et al. | |
| 7,205,939 B2 * | 4/2007 | Zimmerman | 342/464 |
| 7,339,526 B2 * | 3/2008 | Zimmerman | 342/464 |
| 7,345,627 B2 * | 3/2008 | Zimmerman et al. | 342/357.27 |
| 7,388,541 B1 * | 6/2008 | Yang | 342/464 |
| 7,532,160 B1 * | 5/2009 | Zimmerman et al. | 342/357.27 |
| 7,545,281 B2 * | 6/2009 | Richards et al. | 340/573.1 |
| 7,880,608 B2 * | 2/2011 | Richards et al. | 340/539.1 |
| 8,149,107 B2 * | 4/2012 | Richards et al. | 340/539.1 |
| 8,154,411 B2 * | 4/2012 | Richards et al. | 340/573.1 |
| 8,482,399 B2 * | 7/2013 | Breed | 340/500 |
| 8,483,720 B2 * | 7/2013 | Farahani et al. | 455/456.5 |
| 2002/0000916 A1 * | 1/2002 | Richards | 340/572.1 |
| 2003/0184475 A1 * | 10/2003 | Williams et al. | 342/465 |
| 2003/0222778 A1 * | 12/2003 | Piesinger | 340/541 |
| 2004/0062220 A1 * | 4/2004 | Bolgiano et al. | 370/334 |
| 2006/0022872 A1 * | 2/2006 | Zimmerman | 342/464 |
| 2008/0061959 A1 * | 3/2008 | Breed | 340/539.1 |
| 2008/0158062 A1 * | 7/2008 | Fullerton et al. | 342/458 |
| 2009/0256751 A1 * | 10/2009 | Zeller et al. | 342/463 |
| 2010/0283626 A1 * | 11/2010 | Breed | 340/825.49 |
| 2011/0122024 A1 * | 5/2011 | Eidloth et al. | 342/365 |
| 2011/0304499 A1 * | 12/2011 | Eidloth et al. | 342/174 |
| 2012/0146802 A1 * | 6/2012 | Abercrombie et al. | 340/669 |
| 2013/0113647 A1 * | 5/2013 | Sentelle et al. | 342/22 |
| 2013/0113660 A1 * | 5/2013 | Tufvesson et al. | 342/450 |

OTHER PUBLICATIONS

"International Application No. PCT/EP2009/007577, International Preliminary Report on Patentability (German only) mailed Feb. 3, 2011", 9 pgs.

"International Application No. PCT/EP2009/007577, International Search Report and Written Opinion mailed Mar. 22, 2010", 12 pgs.

* cited by examiner

SYSTEM FOR DETERMINING THE MOVEMENT OF A SWAYING STRUCTURE

PRIORITY CLAIM TO RELATED APPLICATIONS

This application is a national stage application under 35 U.S.C. §371 of PCT/EP2009/007577, filed Oct. 14, 2009, and published as WO 2010/043421 A1 on Apr. 22, 2010, which claims priority to German Application No. 10 2008 052 799.8, filed Oct. 15, 2008, which applications and publication are incorporated herein by reference and made a part hereof in their entirety, and the benefit of priority of each of which is claimed herein The invention relates to a system for determining the movement of a swaying structure.

A localization system is known from EP 1 556 713 B1 with which it is possible to track the position of at least one mobile object continuously in real time. In this respect, it is, for example, a question of objects such as balls or players moving on a playing field. In this localization system, a plurality of receivers are fixedly installed and transmitters are attached to the objects and their signals are received and evaluated by the receivers. To enable a highly precise three-dimensional localization, receivers also have to be attached at larger heights, in the best case even directly above the playing field. It is therefore unavoidable to attach the receivers to high masts, with, for example, floodlight masts being convenient with soccer playing fields.

It has, however, been shown that such masts begin to sway under the influence of the wind. These movements influence the real and measured distance between the transmitter, i.e. between the object to be localized, and the receiver. If the movement of the masts is not taken into account, their swaying motion is transferred to the object to be localized. In this respect, in the case of an inactive object, for example a non-moving ball, position fluctuations of several centimeters can arise in the most unfavorable case.

It is also known that the movements of high tower structures or of high-rise buildings due to storms or typhoons are determined via a GPS detection and evaluation.

It is thus the underlying object of the invention to provide a system for determining the movement of a swaying structure to which a receiver is attached, with it being possible by said system to determine a precise change of the position of the structure and thus of the receiver.

This object is achieved in accordance with the invention by a system for determining the movement of a swaying structure in accordance with the features of the main claim.

Advantageous further developments and improvements are possible by the measures set forth in the dependent claims.

A highly precise detection of the fluctuations of the structure is achieved in that at least three reference transmitters are provided which each have known and fixed positions and whose transmission signals are formed as signals modulated onto a carrier with a defined carrier frequency, wherein an evaluation device determines phase measurement values from the received signals while taking the defined carrier frequency into account and the distance from the respective transmitters and the position change of the receiver, and thus of the swaying structure, can be calculated from said phase measurement values. When only three such reference transmitters are used, it is necessary that all transmitters are synchronized and/or coupled in a phase-locked manner to one another and additionally to the receiver. If four such transmitters are installed which are synchronized or coupled in a phase-locked manner to one another, a synchronization with the receiver at the moving structure is not necessary since the unknown reception time can be eliminated with the information gained with the fourth reference transmitter. Another design of the system with which all three-dimensional information can be determined comprises three reference transmitters which are not synchronized or coupled in a phase-locked manner and at least one additional fixed receiver of a known position being provided, wherein the latter is synchronized or coupled in a phase-locked manner to the moving receiver.

The reference transmitters can each have different carrier frequencies; however, it is advantageous that the transmitted signals are modulated onto a carrier frequency common to all reference transmitters since then the evaluation effort and/or cost can be noticeably reduced. For example, the 2.4 GHz ISM band or the 5 GHz band or other bands available according to frequency regulations or frequency allocations can be used. The information to distinguish the individual reference transmitters can then be modulated onto the carrier in a bit sequence as an identification code.

It is particularly advantageous to provide the system in accordance with the invention in an arrangement for calibrating a radio system for determining the position of at least one mobile object in a three-dimensional space with a plurality of receivers or to integrate said arrangement as an infrastructure, wherein at least one receiver is fastened to a swaying structure and wherein an evaluation apparatus is provided which takes account of the position change of the receiver fastened to the structure in the determining of the position of the mobile object. In this manner, the radio system can be calibrated and a highly precise three-dimensional localization can be provided, adjusted for influences of the swaying structure. The receivers are preferably synchronized or coupled in a phase-locked manner with one another; the reference transmitters used may then not be synchronized with one another, whereby inexpensive, small reference transmitters can be used.

An embodiment of the invention is shown in the drawing and will be explained in more detail in the following description. There are shown.

Figure 1:
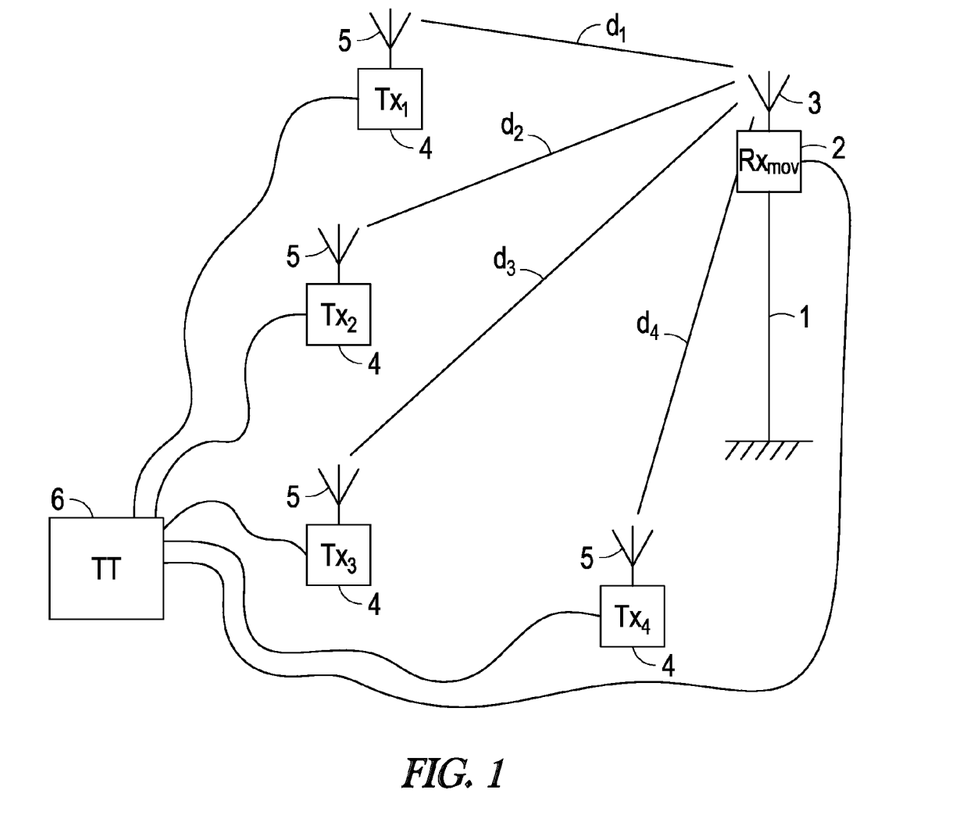
FIG. 1 a schematic representation of a first embodiment of the system in accordance with the invention.

In FIG. 1, a system for determining the movement of a swaying structure, for example of a mast, is shown, with the swaying being caused by environmental influences, namely by the wind or a storm. In FIG. 1, a mast is identified by 1 at which a receiver 2 having an antenna 3 is fixedly arranged. In the environment of the mast 1, a plurality of reference transmitters 4 having antennas 5 are arranged, in the embodiment four transmitters which are stationary and whose position is known. The reference transmitters 4 transmit transmitted signals, for example in the time multiplex process and/or in the code multiplex process, which are formed as signals modulated onto a carrier frequency, wherein the 2.4 GHz ISM band is preferably used as the transmission band, but other bands, such as the 5 GHz ISM band or other bands available according to frequency regulations or frequency allocations can be used. The transmitted signals are preferably transmitted as transmitted bursts, with all reference transmitters 4 utilizing one carrier frequency in the embodiment. Information on the associated reference transmitters 4 is contained in the transmitted signals, e.g. identification codes, which is modulated onto the carrier as a bit sequence. The reference transmitters 4 are synchronized to one another, i.e. they all have the same reference clock, e.g. they are connected via a fiber optic network to a clock source 6 or via radio and freewheeling atomic clocks or the like. In accordance with the above description, FIG. 1 shows exactly one variant of a plurality of solution possibilities.

If, for example, the receiver time of the receiver 3 is also synchronized with the transmitter times of the reference transmitters 4, one of the reference transmitters 4 can be omitted. This is shown in FIG. 2 and for the evaluation of the simplest case since all transmitters 4 and the receiver 3 have the same clock.

Figure 2:
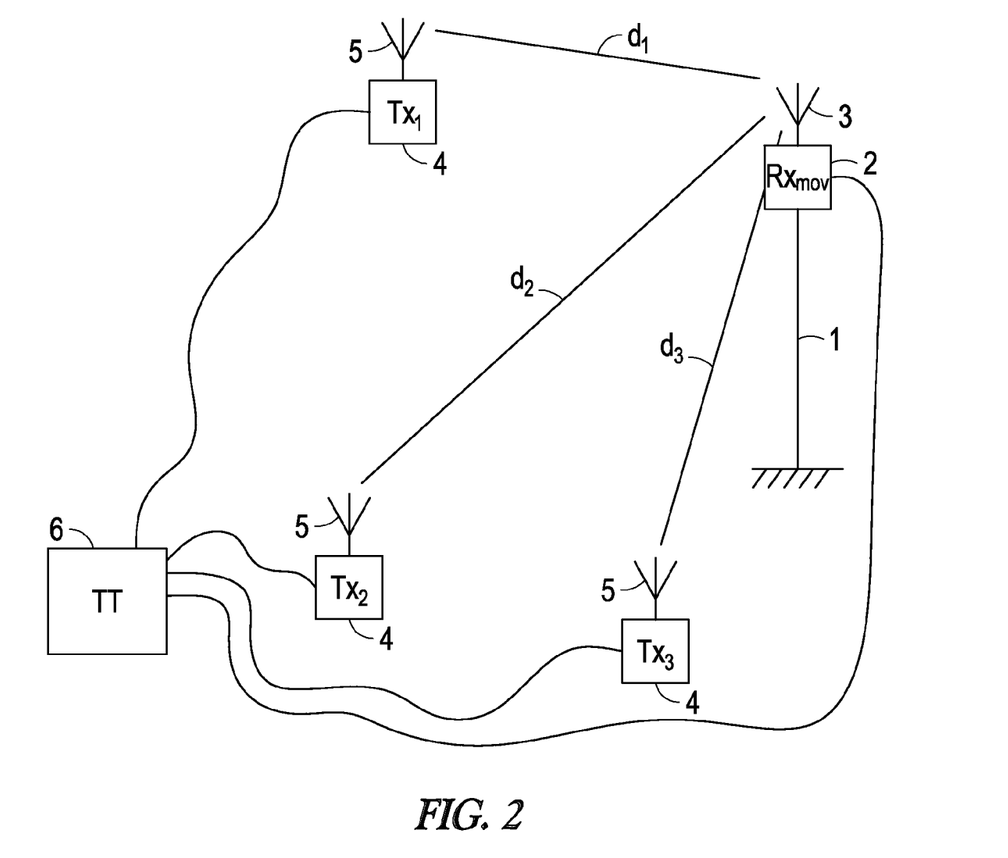
FIG. 2 a schematic representation of a second embodiment of the system in accordance with the invention.
Figure 3:
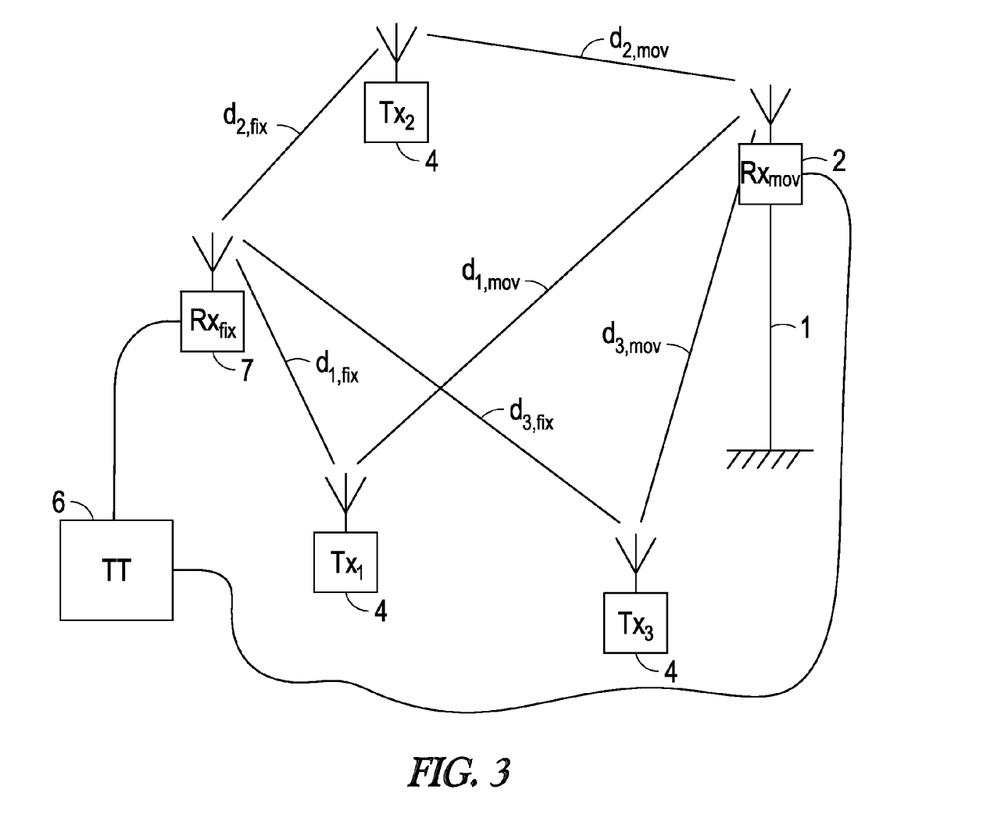
FIG. 3 a schematic representation of a third embodiment of the system in accordance with the invention.

FIGS. 1 and 2 could equally also be modified in accordance with FIG. 3 in the respect that three unsynchronized reference transmitters 4 and two receivers 2, 7 are used which are synchronized to one another; this is shown by the connections to the clock source 6. In this respect, one 7 of these receivers is located at a fixed reference position and the other 2 at the swaying structure.

In the embodiments in accordance with FIGS. 1 to 3, the transmitted bursts received and transmitted by the reference transmitters 4 are mixed down to the base band in the antenna unit of the receiver 2, i.e. the carrier of, for example 2.4 GHz is removed and the identification information on the reference transmitters 4 is taken into account in the further processing. Then the respective received phasing of the carrier at the receiver 2 is compared with that of the respective reference transmitter 4, i.e. the phase difference is formed. This phase difference or the measured phase angle decreases with the respective distance $d_i$ between the reference transmitter 4 and the receiver 2 and generally corresponds to $2\pi d_i/\lambda$. The distance $d_i$ is thus determined in the simplest case (FIG. 2) by $$d_i = -\varphi_{ei} * \frac{\lambda}{2\pi} + o_i$$

where i is the index over the reference transmitters 4 and $\phi_{ei}$ stands for the measured phase value in radiants which is determined by means of the phasing measured in the receiver 2 and by means of the formation of the named phase difference and $\lambda$ stands for the wavelength of the carrier in meters. At a carrier frequency of 2.4 GHz, the wavelength amounts to 12.27 cm. $o_i$ is a distance offset, likewise in meters.

In the embodiment in accordance with FIG. 1 in which the receiver 2 has its own clock source, a distance change, not given, would occur due to a frequency offset between the clock source 6 and that of the receiver 2. Since the calculated distances for all reference transmitters 4 would be falsified in the same manner, an error can be eliminated with the information of the fourth reference transmitter 4 by forming distance differences.

Accordingly, in the embodiment in accordance with FIG. 3, it is possible to make a back calculation to the phase angle at the reference transmitter 4 at the transmission time using the measured phase values determined at the fixed receiver 7 and the known distances between the reference transmitters 4 and the receiver 7. The reference transmitters 4 are thus synchronized in a mathematical manner with the moving receiver 2. Subsequently, distances between the moving receiver 2 and the reference transmitters 4 can be calculated. This is done while including the calculated phase angles at the transmitter 4, the measured phase values at the moving receiver 2 and the distance offset from the above equation.

The offset is initially determined by a position of the mast 1 determined by a measuring device, e.g. a laser measuring device, by the position of the reference transmitters 4 and by the first phase measurement of the respective transmitter/receiver path using the above-named equation.

This initial offset is corrected in the further course of the measurement to take different influences into account and is adapted to the respective then current offset. The corrections represent the compensation of the temperature drift in the system, an adaptation of the absolute position and a correction of the so-called "cycle slips" ($2\pi$ phase jumps).

Since the measured lengths can also change on a change of the temperature in the system, such a drift must be compensated, and indeed by adapting the offset. Since the drift, i.e. the migration away of the measured value, takes place slowly, it is superimposed on the change of the measured value by actual movement and can, for example, be detected by filtering processes. It is thereby ensured that on length changes which exceed half a wavelength, no position jumps occur as a consequence of the ambiguity of the wavelength in the system.

A further slow correction of the respective offset $o_i$ ensures that the mean position of the receiver 2 corresponds to the position which was determined by the laser measuring device. Since work is only carried out with measured phase values in accordance with the invention, no absolute position can be determined. As already mentioned above, at the system start, a start is made with a position which was determined without the influence of the wind and which is already known to the system. This can, however, result in larger errors if the actual position of the receiver 2 differs greatly from this known position on the system start. The correction is achieved in that the measured position is updated in the direction of this known position on the basis of mean values of the measurements. This correction makes use of the fact that the mast oscillates about its "position of rest". A complicated and/or expensive determination of the absolute position can be dispensed with by this procedure.

It must be noted on the measurement of the phase values that the solution of the above equation is likewise ambiguous due to the $2\pi$ ambiguity of the measured phase values, i.e. it can occur by changing the measured distance that jumps occur from one phase measurement to the next which, as already stated, have a value of $2\pi$. If these were not compensated, the measured distance would jump by one wavelength and thus substantially change the position result. A further correction of the offset is thus carried out to prevent distance jumps since the distance corresponds to the sum of the measured phase value (in meters) and the offset. This is no longer a case of slow corrections here since the offset can jump by one wavelength from burst to burst to compensate a phase jump which occurs on the measurement. This compensation takes place by the so-called phase unwrapping of the relative measured phase values which is carried out on the offsets.

In an evaluation apparatus, which is, for example, a computer arranged remotely from the receiver 2 and to which the results of the measurement of the distance $d_i$ are transmitted, these are used to determine the position of the mast 1 or of the receiver 2 at intervals or continuously. The measured phase values can naturally also be transmitted to the evaluation apparatus, with then the corresponding position being determined using the above equation. Usually, Kalman filters are used for the evaluation, with other processes and processing apparatus, however, also being able to be used such as algebraic algorithms, e.g. the Bancroft algorithm, or such as neuronal networks or particle filters. Three coordinates for the position of the receiver 2 are then delivered by the evaluation apparatus.

Figure 5:
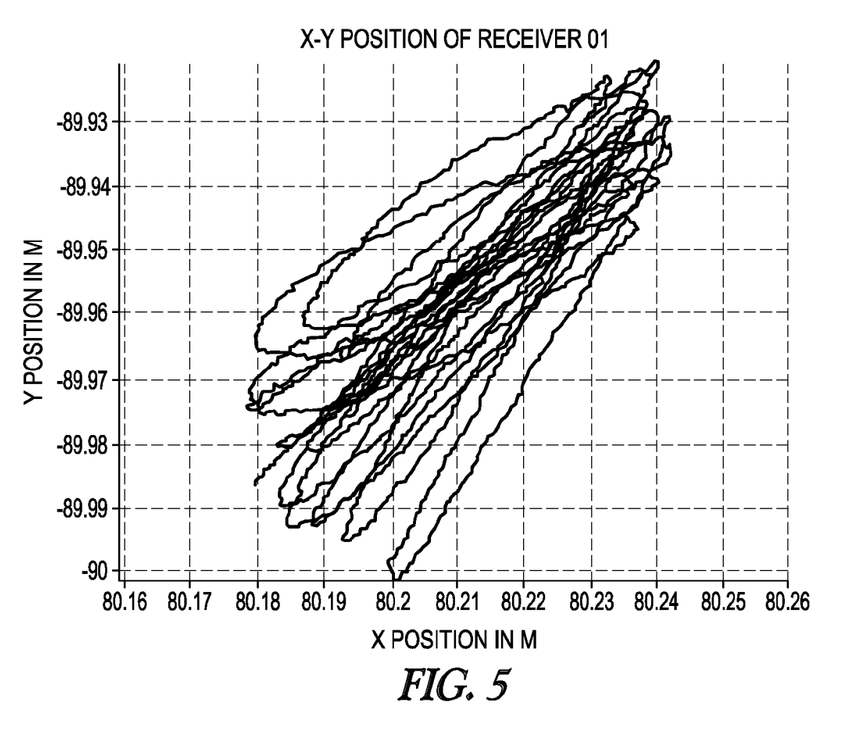
FIG. 5 a view from above in the X-Y coordinate system of the determined position of a floodlight mast.

FIG. 5 shows the view from above, i.e. the X and Y positions in a selected coordinate system, of the position of the mast 1 determined by means of the phase measurement. The oscillation of the movement of the mast can clearly be recognized.

Figure 6:
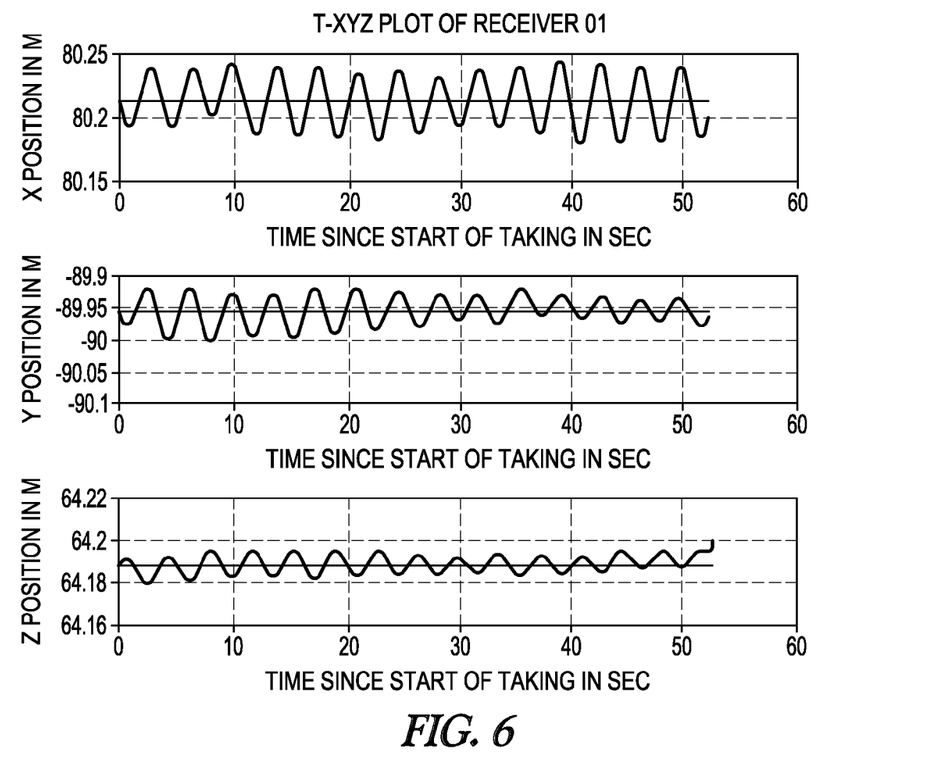
FIG. 6 a representation of the X position, the Y position and the Z position of the floodlight mast over time.

In FIG. 6, the position developments of the individual coordinate axes are shown over time, with the middle line each indicating the position of the mast which was initially determined by the laser measurement. The residual oscillation to be recognized on the Z coordinate does not, however, exist physically; this error arises due to the arrangement of the reference transmitters 4 with respect to the moving receiver 2. The receiver 2 sees all reference transmitters 4 in a relatively small spatial angle, which has the result that a cross-talk between the individual coordinate axes arises.

Figure 4:
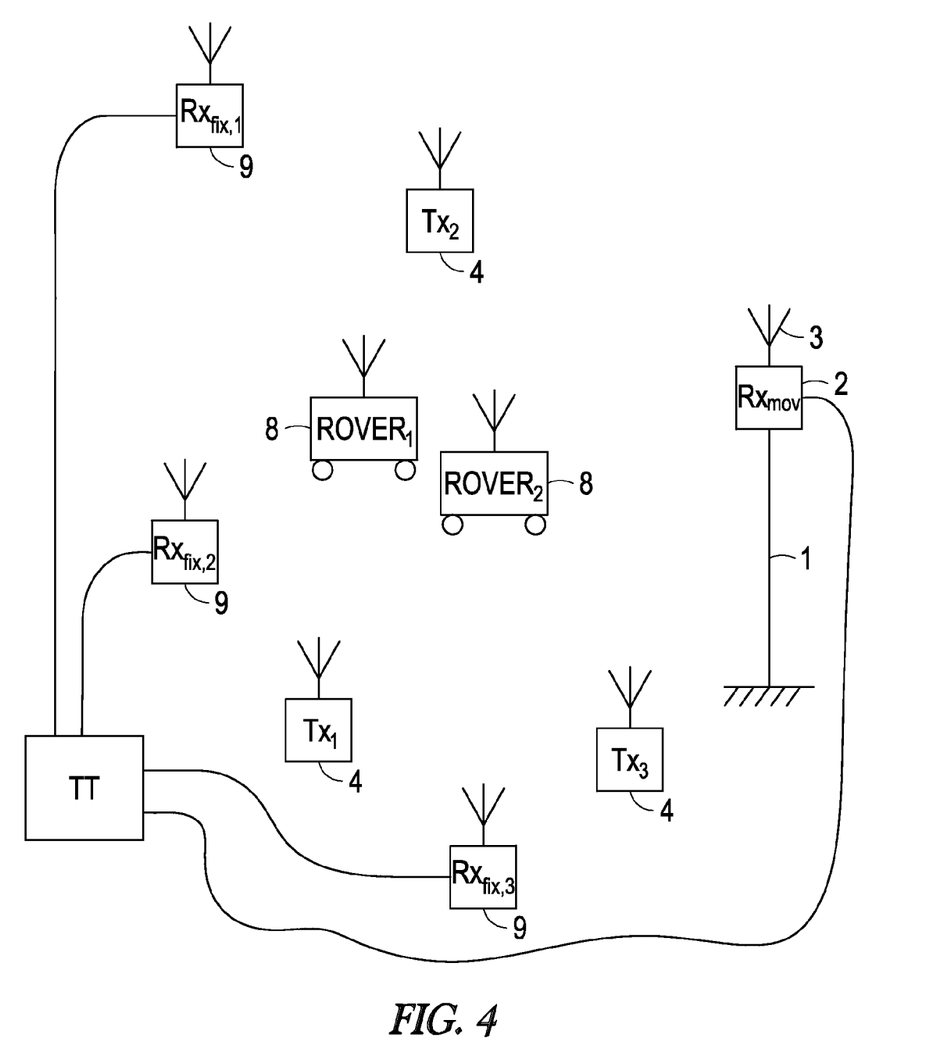
FIG. 4 a schematic representation of the third embodiment of the system in accordance with the invention which is integrated into a localization system.

Such a system, as described above, or such a method can be used with an arrangement for the highly precise three-dimensional localization of one or more moving objects, in particular one or more objects moving over a playing field, such as a ball and/or a player. This system is shown in FIG. 4. Two moving objects are provided by way of example which are provided with a transmitter 8 and a plurality of receivers 9, 2 is arranged around the playing field or even above the playing field, with at least some of the receivers, in the embodiment a receiver 2, are attached, for example, to floodlight masts. In such a system, the fixed reference transmitters 4 are then positioned in the proximity of the playing field and the receivers fastened to the floodlight masts correspond to the receiver 2 and the receivers 9 correspond to the receiver 7 of FIG. 3. The respective object transmitter 8 transmits radio signals to the receivers 2, 9 and the received signals are evaluated to determine the position of the moving object in an evaluation device which can correspond to the above-mentioned evaluation device for determining the position of the moving mast 1. On the evaluation for determining the object position, the swaying movements in accordance with FIG. 5 and FIG. 6 of the receiver 2 are also taken into account and the position of the moving object is correspondingly corrected. In the localization system shown, the receivers are synchronized with one another, which is indicated by the connection lines to the clock source 6. The system integrated into this localization system for determining the swaying movements of the mast 1 here serves as an infrastructure for calibrating the localization system with a corresponding increase in the precision. Small, inexpensive miniature transmitters not connected to one another can then be used as reference transmitters 4.

In another embodiment in which the swaying of a mast or of a building is determined, the fluctuation is, as already described above, calculated from the position developments of the individual coordinates, where necessary under different weather conditions.

What is claimed is:

1. An arrangement for calibrating a radio system for determining the position of at least one mobile transmitter in a three-dimensional space using a plurality of receivers of which at least one is fastened to a structure swaying due to environmental influences and comprising a system including at least three reference transmitters having a respective known and fixed position whose transmitted signals are formed as signals modulated onto a carrier whereby the carriers of the at least three reference transmitters have the same defined carrier frequency, an evaluation device which is configured to determine measured phase values from the transmitted signals of the individual reference transmitters received by the receiver fastened to the swaying structure while taking account of the defined carrier frequency, from which measured phase values the distance respectively from the reference transmitters and the position change of the receiver at the swaying structure, can be calculated, wherein a further evaluation device is provided which calculates the position of the mobile transmitter taking account of the position change of the receiver fastened to the structure in the determination of the position of the mobile transmitter.

2. The arrangement in accordance with claim 1, wherein the evaluation device is configured to calculate the distance between the receiver at the swaying structure and the respective reference transmitter from $$d_i = -\varphi_{ei} * \frac{\lambda}{2\pi} + o_i$$

where d is the distance between the respective reference transmitter and the receiver, i is the index over the reference transmitters, $\phi_{ei}$ is the measured phase value at the receiver for the respective reference transmitter in rad, $\lambda$ is a wavelength of the carrier in m, and $o_i$ is a respective offset in m.

3. The arrangement in accordance with claim 2, wherein the evaluation device is configured to initially determine the respective offset by a position of the structure which is measured by a measuring device, by the position of the fixed reference transmitters and by a first phase measurement.

4. The arrangement in accordance with claim 1, wherein the at least three fixed reference transmitters having a known position and the one receiver fixed to the swaying structure are synchronized in time.

5. The arrangement in accordance with claim 1, wherein, in addition to the receiver at the swaying structure, at least one of the plurality of the receivers is a fixed receiver of a known position, wherein the reference transmitters are not synchronized and the swaying receiver and the fixed receiver are synchronized and the transmission times of the respective reference transmitters of a known position can be calculated via the respective received signals of the fixed transmitter.

6. The arrangement in accordance with claim 2, wherein the evaluation device is configured to adapt the value of the respective offset when temperature changes in the system occur, wherein the measured value change due to the temperature change can be detected via filtering processes.

7. The arrangement in accordance with claim 2, wherein the evaluation device is configured to compensate a possible deviation of the position of the swaying structure from the measured position at the start of the determination by changing the values of the respective offset via mean value evaluation of the measured position values.

8. The arrangement in accordance with claim 2, wherein the evaluation device is configured to adapt the values of the respective offset for the compensation of $2\pi$ phase jumps of the measured phase values, wherein an abrupt distance change is evaluated.

* * * * *

UNITED STATES PATENT AND TRADEMARK OFFICE
CERTIFICATE OF CORRECTION

PATENT NO. : 8,604,964 B2  Page 1 of 1
APPLICATION NO. : 13/124277
DATED : December 10, 2013
INVENTOR(S) : Eidloth et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 300 days.

Signed and Sealed this
Twenty-second Day of September, 2015

Michelle K. Lee
*Director of the United States Patent and Trademark Office*